(12) United States Patent  
Muranaka et al.

(10) Patent No.: US 7,424,391 B2  
(45) Date of Patent: Sep. 9, 2008

(54) PERIOD DIVISION STATISTICS DEVICE, METHOD, AND PROGRAM PRODUCT

(75) Inventors: Makoto Muranaka, Toyama (JP); Hiroshi Miyakawa, Toyama (JP); Shinya Nishikawa, Toyama (JP); Maria Kita, Toyama (JP); Daisaku Tanaka, Toyama (JP)

(73) Assignee: Fujitsu Limited, Kawasaki (JP)

( * ) Notice: Subject to any disclaimer, the term of this patent is extended or adjusted under 35 U.S.C. 154(b) by 23 days.

(21) Appl. No.: 11/603,621

(22) Filed: Nov. 21, 2006

(65) Prior Publication Data

US 2007/0223522 A1    Sep. 27, 2007

(30) Foreign Application Priority Data

Mar. 22, 2006   (JP) .............................. 2006-079675

(51) Int. Cl.  
    *G06F 17/18*   (2006.01)
(52) U.S. Cl. ..................................... 702/181
(58) Field of Classification Search .............. 702/181, 702/187  
    See application file for complete search history.

(56) References Cited

U.S. PATENT DOCUMENTS

2004/0057389 A1 *   3/2004   Klotz et al. .................. 370/252

2005/0076113 A1 *   4/2005   Klotz et al. .................. 709/224

FOREIGN PATENT DOCUMENTS

JP           11-138147           5/1999

* cited by examiner

*Primary Examiner*—Bryan Bui  
(74) *Attorney, Agent, or Firm*—Greer, Burns & Crain, Ltd.

(57) ABSTRACT

A statistics system stores inputted statistical target information into storage. When each unit time period defined in a statistical calculation rule expires, the statistics system reads all pieces of statistical target information whose occurrence times are contained in the unit time period from storage, executes statistical calculation, and registers the statistical result to the statistical information in storage. When statistical target information is inputted, the statistics system sets a re-calculation flag to a unit time period including the occurrence time shown by the statistical target information among the respective unit time periods whose statistical results are registered in the statistical information. The statistics system reads all pieces of the statistical target information whose occurrence times are contained in the unit time period from storage for each of the flagged unit time periods, re-executing the statistical calculation, and overwrites the statistical result onto the information in storage.

12 Claims, 2 Drawing Sheets

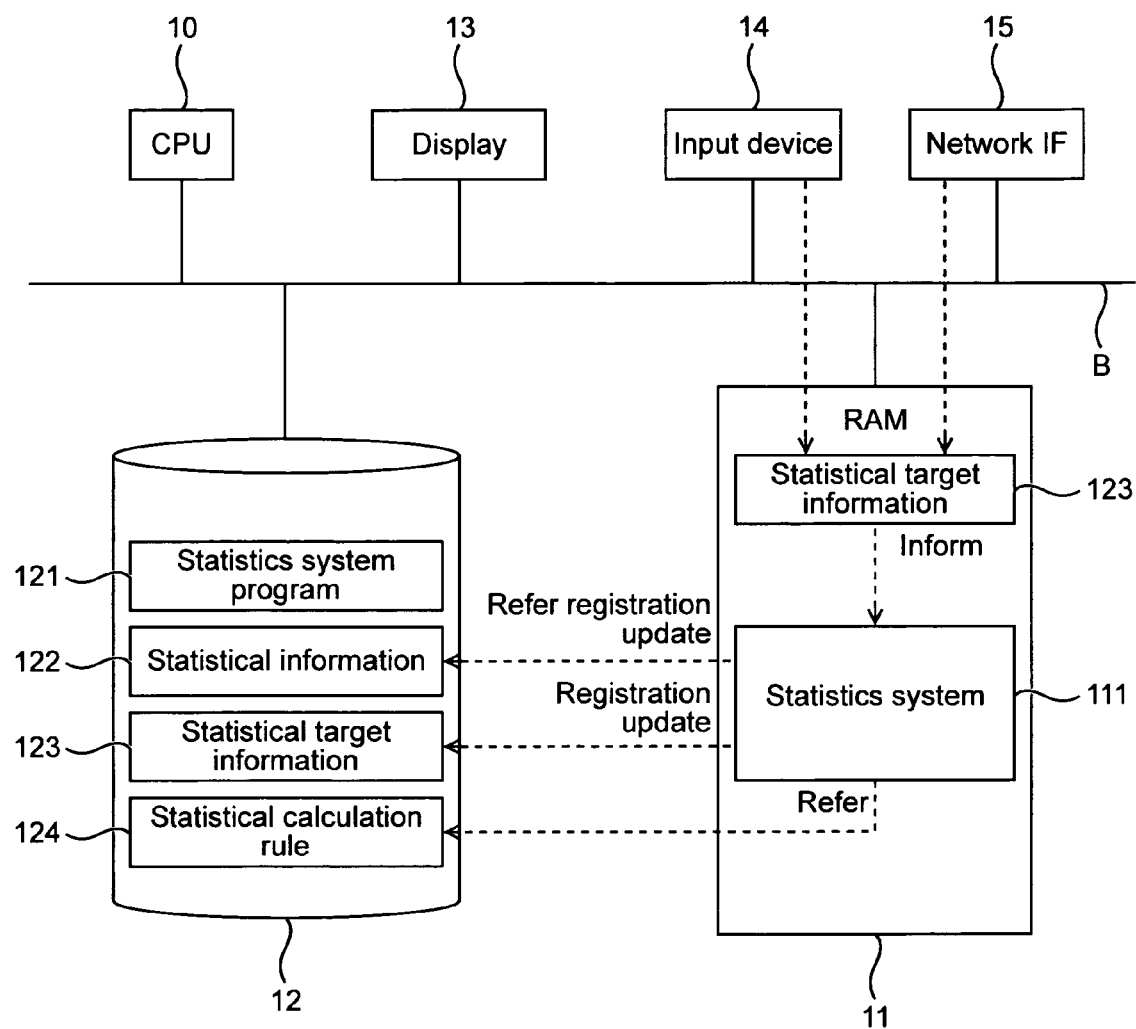

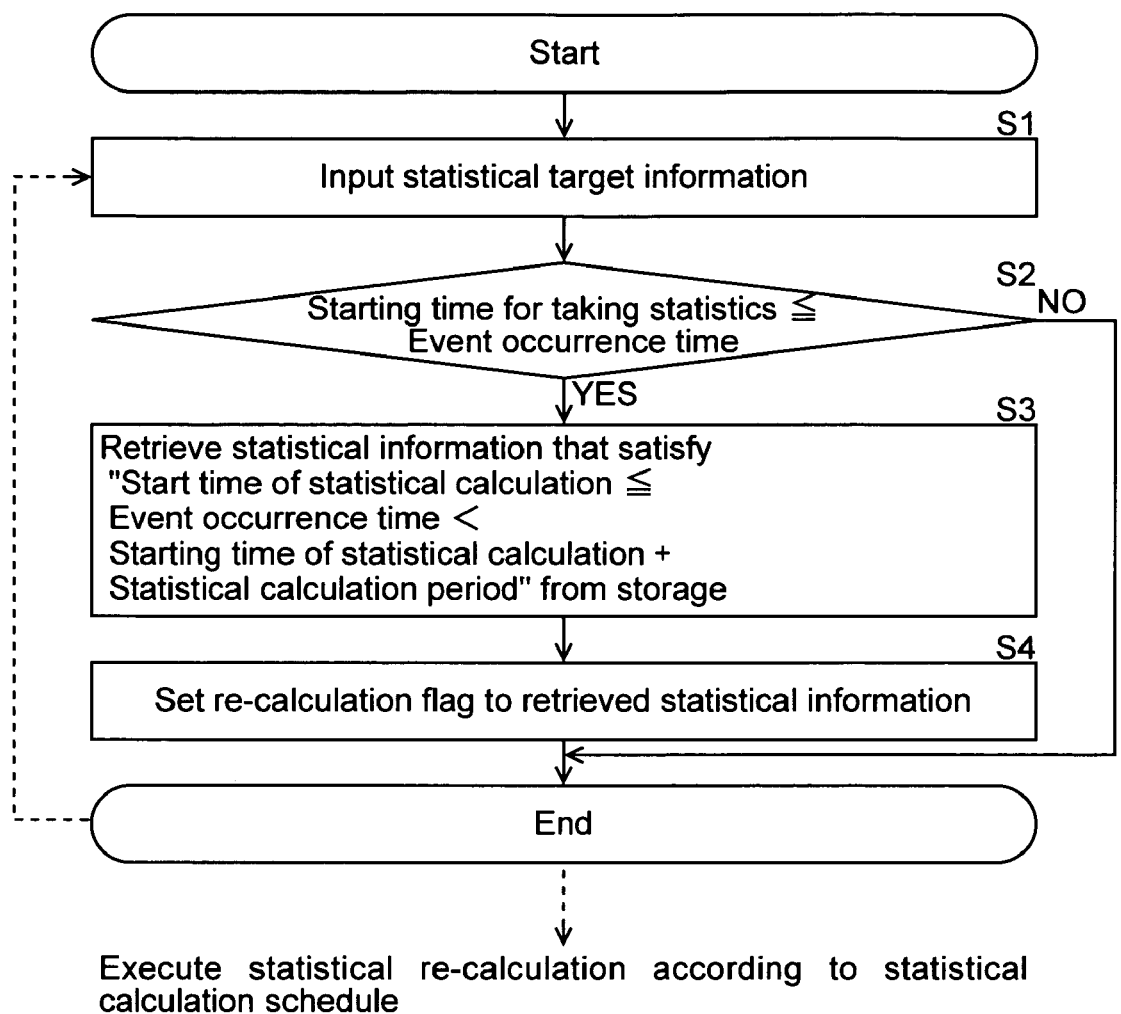

PERIOD DIVISION STATISTICS DEVICE, METHOD, AND PROGRAM PRODUCT

BACKGROUND OF THE INVENTION

The present invention relates to a period division statistics device for collecting information about events that occur at certain times (namely, time series data) for every unit time period in which occurrence times of the events belong. Further, the present invention relates to a period division statistics method and a program product thereof.

When statistics of information about events that occur at certain times (namely, time series data) is taken based on an input by a single sensor or a plurality of sensors that are connected through a high-speed network and are able to process in high speed, the pieces of information are systematically inputted to a computer that executes statistical process in a chronological order (the order of time series) of the events. Therefore, in such a case, the computer can simply execute statistical calculations by sequentially taking the pieces of information that are inputted in the order of time series.

However, for example, when the information about an event is inputted through a human operation, a variation of time interval (response) from the time of occurrence of the event to the time of input of the information about the event to a computer through a terminal may become large. In such a case, since a computer can not predict the receive timing of the information from each terminal, the computer must execute statistical calculation based on the information that has been received until a certain time. As a result, there may be cases where the information that should have been essentially made the statistical target is inputted to the computer after the completion of the statistical calculation.

In such a case, if the information that is inputted after the statistical calculation is disregarded without reflecting it to the statistical result, an appropriate statistical result can not be obtained. On the other hand, in order to obtain an appropriate statistical result, whenever the information that should have been essentially made the statistical target is input after the completion of the statistical calculation, the computer must repeat statistical calculation so as to reflect the newly inputted information to the statistical result.

The conventional period division statistics program is disclosed in JP2005-189981A, for example.

However, if the inputted amount of information is large, an operator who operates a computer does not know which section of the statistical result is affected by the newly inputted information. As a result, the operator must repeat the statistical calculation based on all the inputted information, which increases the load onto the computer, deteriorating the efficiency of performance.

SUMMARY OF THE INVENTION

The present invention has been accomplished in view of the above-mentioned problems, and an object thereof is to provide an improved period division statistics device that is capable of minimizing the load of re-calculation to a computer when the information that should have been essentially made the statistical target is inputted after the statistical result has been obtained by completion of the statistical calculation based on the inputted information, under the condition where time interval from the occurrence time of the event to the time of inputting the information about the event to a computer may vary largely.

A period division statistics device of a first aspect according to the present invention stores statistical target information into storage, when the information is inputted through an input device, while referring to a statistical calculation rule that defines a starting point of a statistical target period, an interval of a starting point of each unit time period and a time length of each unit time period in order to divide the statistical target period into a plurality of unit time periods. Further, when any of the unit time periods, which is specified by the interval of starting point and the time length that are defined in the statistical calculation rule, expires, the period division statistics device reads all pieces of the statistical target information whose occurrence times are contained in the expired unit time period from the storage, executes predetermined statistical calculations for the values of events indicated by the read statistical target information, and stores a statistical result obtained by the statistical calculations into the storage. Still further, when the statistical target information is inputted through the input device, the period division statistics device selects the unit time period that contains the occurrence time of the event indicated by the inputted statistical target information among the unit time periods whose statistical results are registered in the storage. Then, the period division statistics device reads all pieces of the statistical target information whose occurrence times are contained in the selected unit time period from the storage for each of the selected unit time periods, re-executes the statistical calculation for the values of events indicated by the read statistical target information, and overwrites the statistical result onto the storage.

As a result, when pieces of statistical target information are not inputted in the order of the event occurrence time, and new statistical target information about an event that occurred at the time close to the occurrence times of the pieces of the statistical target information that have been used to the statistical calculations is inputted after the statistical calculations are completed and the statistical result has been obtained, the statistical calculation is re-executed only for the unit time period that contains the occurrence time indicated by the newly inputted statistical target information based on the newly inputted statistical target information and the statistical target information that is registered in the storage as the occurrence time is contained in the unit time period. Therefore, since it is unnecessary to re-execute statistical calculations for all the statistical target information stored in the storage, the processing load of a computer can be minimized.

A period division statistics device of a second aspect according to the present invention, stores statistical target information into storage, when the information is inputted through an input device, while referring to a statistical calculation rule that defines a starting point of a statistical target period, an interval of a starting point of each unit time period and a time length of each unit time period in order to divide the statistical target period into a plurality of unit time periods. Further, when any of the unit time periods, which is specified by the interval of starting point and the time length that are defined in the statistical calculation rule, expires, the period division statistics device reads all pieces of the statistical target information whose occurrence times are contained in the expired unit time period from the storage, executes predetermined statistical calculations for the values of events indicated by the read statistical target information, and stores a statistical result obtained by the statistical calculations into the storage. Still further, when the statistical target information is inputted through the input device, the period division statistics device sets a flag to the unit time period that contains the occurrence time of the event indicated by the inputted statistical target information among the unit time periods whose statistical results are registered in the storage. Then, the period division statistics device reads all pieces of the statistical target information whose occurrence times are contained in the unit time period from the storage for each of the flagged unit time periods among the unit time periods whose statistical results are registered in the storage, re-executes the statistical calculation for the values of events indicated by the read statistical target information, and overwrites the statistical result onto the storage.

As a result, it is unnecessary to execute the statistical calculation for all pieces of the statistical target information stored in the storage as with the above-mentioned first aspect. Further, when new statistical target information is inputted, the period division statistics device does not re-execute the statistical calculation immediately, and the unit time period that should be re-calculated is flagged. Then, since the period division statistics device checks the conditions of flags at fixed intervals and re-executes the statistical calculations for the flagged unit time periods at the same time, the frequency of the re-examination of the statistical calculation is lowered, which further reduces the processing load of a computer.

According to the period division statistics device of the present invention constituted as mentioned above, when the information that should have been essentially made the statistical target is input after the statistical result has been obtained by completion of the statistical calculation based on the inputted information, under the condition where time interval (response) from the time of occurrence of the event to the time of inputting the information about the event to a computer may vary largely, the statistical calculation is re-executed only for a part of the obtained statistical result corresponding to the unit time period that contains the occurrence time indicated by the newly inputted statistical target information, which can minimize a load of re-calculation by a computer.

DESCRIPTION OF THE ACCOMPANYING DRAWINGS

FIG. 1 is a block diagram showing a generic constitution of a computer into which a statistics system program of an embodiment of the present invention is installed, and FIG. 2 is a flow chart showing contents of a process executed by a CPU according to the statistics system program.

DESCRIPTION OF THE PREFERRED EMBODIMENTS

Hereafter, the embodiment of a present invention will be described with reference to drawings.

<Constitution>

FIG. 1 is a block diagram showing a generic constitution (hardware constitutions and program configuration) of a computer into which a statistics system program of an embodiment of the division period statistics program of the present invention is installed. As shown in FIG. 1, the computer has a CPU 10, a RAM 11, storage 12, a display 13, an input device 14 and a network interface 15 as main components. These components are mutually connected through a bus B.

The CPU 10 is a central processing unit that executes a predetermined process by reading and executing programs, and it corresponds to the computer defined in the claims.

The storage 12 is a hard disk (a computer readable storage medium) that stores various programs that are executed by the CPU 10 and various data. One of the programs that are stored in the storage 12 is the above-mentioned statistics system program 121. The data stored in the storage 12 includes a statistical calculation rule 124 that is referred by the function of the CPU 10 that executes the above-mentioned statistics system program 121, statistical information 122 and statistical target information 123 that are generated by the function of the CPU 10 that executes the above-mentioned statistics system program 121.

The display 13 is an output device on which the CPU 10 displays its processing result as a screen. The input device 14 means a keyboard, a pointing device or the like that are operated by an operator to input various command and data to the CPU 10. The network interface 15 is a communication device that transmits data to a network and receives data from the network according to a predetermined communications protocol.

The RAM 11 is a main memory on which the program read from the storage 12 is cached and a workspace is developed when the CPU 10 executes the above-mentioned process. FIG. 1 shows the condition where the statistics system program 121 is developed on the workspace of the RAM 11 as the statistics system 111 when the statistics system program 121 is read by the CPU 10. The statistical target information that is inputted through the input device 14 operated by an operator, or the statistical target information 123 that is received from a terminal (not shown) through the network interface 15 is read onto the above-mentioned RAM 11.

The statistical target information 123 is a traveling expenses for business that is demanded by an employee from a company in the embodiment. That is, an event shown by the statistical target information 123 is expenditure of traveling expenses for business, and the statistical target information 123 consists of an "application target date" as an occurrence time of an event (namely, expenditure date of traveling expenses for business) and an "application amount" as a value of the information as shown in the following table 1.

TABLE 1

| Statistical target information | |
|---|---|
| Application target date | Application amount |
| 2005/4/10 | 30,000 |
| 2005/5/31 | 21,000 |

The statistics system 111 stores (registers) the statistical target information 123 into the storage 12 regardless of an application target date (an occurrence time of an event) when the statistical target information 123 is inputted. The statistics system 111 reads the statistical target information 123 registered in the storage 12 and executes statistical calculations while referring to the statistical calculation rule 124. The details of the statistical calculation rule 124 are shown in Table 2.

TABLE 2

| Statistical calculation rule | |
|---|---|
| Item | Description |
| Starting time for taking statistics | 2005/04/01 0:00 |
| Statistical calculation period | Four weeks |

TABLE 2-continued

Statistical calculation rule

| Item | Description |
| --- | --- |
| Interval of statistical calculation | One week |
| Statistical calculation schedule | Not set |

The statistical calculation rule 124 consists of items of a "starting time for taking statistics", a "statistical calculation period", an "interval of statistical calculation", and a "statistical calculation schedule".

A date and time that is a starting point for calculating the statistical information (statistical result) is defined in the "starting time for taking statistics". The statistical target period is divided into many unit time periods. The first unit time period starts from the time defined in the "starting time for taking statistics". A following unit time period starts every period that is defined in the "interval of statistical calculation". Each unit time period has a time length that is defined in the "statistical calculation period". With this system, the statistical calculation is executed for each unit time period based on the statistical target information 123 whose event occurrence time ("application target date") is contained in the unit time period. That is, a combination of value and module that specifies a length of the unit time period is defined in the "statistical calculation period" (for example, "10 minutes", "one week", or the like) Further, a combination of value and module that specifies an interval of starting point of each unit time period is defined in the "interval of statistical calculation" (for example, "10 minutes", "one week", or the like). In the example of Table 2, since the unit time periods that have four-week length start every one week, adjacent unit time periods are partially overlapped. Therefore, an event occurrence time (an "application target date") is contained in four unit time periods. As a result, for example, if the statistical calculation finds an average, so-called moving average will be obtained. The value of the statistical calculation period may be equal to the value of the interval of statistical calculation. If they have the same value, the statistical target period is divided into a plurality of unit time periods without overlapping.

A timing of the statistical calculation that is re-executed after the statistical calculation for each unit time period has been completed is defined in the "statistical calculation schedule". That is, the "starting point" that specifies the first timing for executing the re-calculation and the "interval" that specifies a cycle for repeating the re-calculation are defined in the "statistical calculation schedule".

The statistics system 111 executes the first statistical calculation for each unit time period after a lapse of the unit time period from the "starting time for taking statistics" of the statistical calculation rule 124. The statistical calculation includes extractions of the sum total, an average, and the maximum value, etc., for example. The result of the statistical calculation is registered into the storage 12 as the statistical information 122. The following Table 3 is an example of the statistical information 122 calculated according to the statistical calculation rule of Table 2.

TABLE 3

Initial condition of statistical information

| Starting time of statistical calculation | Total manpower | Average of traveling expense | Re-calculation flag |
| --- | --- | --- | --- |
| 2005/04/01 | 23 | 28,043 | |
| 2005/04/08 | 27 | 29,074 | |
| 2005/04/15 | 26 | 26,923 | |
| 2005/04/22 | 31 | 30,806 | |
| 2005/04/29 | 32 | 25,938 | |
| 2005/05/06 | 30 | 25,333 | |
| 2005/05/13 | 38 | 27,368 | |
| 2005/05/20 | 36 | 26,944 | |
| 2005/05/27 | 38 | 25,789 | |
| 2005/06/03 | 45 | 28,111 | |
| 2005/06/10 | 35 | 25,857 | |
| 2005/06/17 | 27 | 27,963 | |
| 2005/06/24 | 13 | 27,308 | |

Each entry in the statistical information 122 corresponds to the statistical result about each unit time period. The starting time of the unit time period (namely, [the starting time for taking statistics]+n×[the interval of statistical calculation], where n is a positive integer) is registered into the "starting time of statistical calculation" field of each entry. The number of pieces of the statistical target information that is used as the basis of the statistical calculation about the unit time period is registered in the "total manpower" field. The result of the statistical calculation about the unit time period (the statistical result, which is the average of the values of the events indicated by the statistical target information in the example of Table 3) is registered into the "average of traveling expenses" field. When the statistical target information 123 whose event occurrence time (the "application target date") is contained in the current unit time period is inputted, re-execution of the statistical calculation is required. In such a case, a flag showing the necessity of the re-calculation is set in the "re-calculation flag" field. When this flag is not set, the statistical calculation about the unit time period is not re-executed even if the timing of re-calculation ([the starting point]+n×[the interval], where n is a positive integer) comes.

<Process>

Next, the process that is executed by the above-mentioned statistics system 111 (the CPU 10 that operates according to the statistics system program 121) will be described with reference to the flowchart shown in FIG. 2. The following description omits apart of process that the first statistical calculation is executed to register the statistical result into the storage 12 for each unit time period.

After executing the first statistical calculation, the statistics system 111 advances the process from S1 to S2 when the statistical target information 123 is inputted. In step S2, the statistics system 111 checks whether the event occurrence time (the "application target date") in the statistical target information 123 that it is inputted in S1 is later than (larger than) the date and time specified in the "starting time for taking statistics" of the statistical calculation rule 124. And if the former is earlier than the latter, the statistics system 111 judges that it is not within the statistical target, and finishes the process with respect to the current statistical target information 123. On the other hand, if the former is later than the latter, the statistics system 111 judges that it is within the statistical target, and advances the process from S2 to S3.

In step S3, the statistics system 111 refers the statistical calculation rule 124 and retrieves the statistical information 122 in the storage 12 for the entry of the unit time period whose starting time point (that is, [the starting time of statistical calculation]=[the starting time for taking statistics]+n× [the interval of statistical calculation]) is earlier than the event occurrence time (the "application target date") of the statistical target information 123 that is inputted in S1 and whose expiration time point ([the starting time of statistical calculation]+[the statistical calculation period]) is later than the event occurrence time (the "application target date") of the statistical target information 123.

In the next step S4, the statistics system 111 sets flags to the "re-calculation flag" fields of all the entries of the statistical information 122 retrieved in S3. Table 4 shows a condition where the statistical target information 123 shown in Table 1 is newly inputted to the registered statistical target information 123 shown in Table 3 according to the process shown in FIG. 2. The flags are set in the "re-calculation flag" fields of the statistical information 122 in S4 of the process shown in FIG. 2.

TABLE 4

Statistical information after setting re-calculation flag

| Starting time of statistical calculation | Total manpower | Average of traveling expense | Re-calculation flag (○: flagged) |
|---|---|---|---|
| 2005/04/01 | 23 | 28,043 | ○ |
| 2005/04/08 | 27 | 29,074 | ○ |
| 2005/04/15 | 26 | 26,923 | |
| 2005/04/22 | 31 | 30,806 | |
| 2005/04/29 | 32 | 25,938 | |
| 2005/05/06 | 30 | 25,333 | ○ |
| 2005/05/13 | 38 | 27,368 | ○ |
| 2005/05/20 | 36 | 26,944 | ○ |
| 2005/05/27 | 38 | 25,789 | ○ |
| 2005/06/03 | 45 | 28,111 | |
| 2005/06/10 | 35 | 25,857 | |
| 2005/06/17 | 27 | 27,963 | |
| 2005/06/24 | 13 | 27,308 | |

The statistics system 111 executes the above-mentioned process from S1 to S4 repeatedly every time the statistical target information 123 is newly inputted.

When the timing of re-calculation ([the starting point]+n× [the interval]) registered in the "statistical calculation schedule" of the statistical calculation rule 124 has come, the statistics system 111 re-executes the statistical calculations for the entries where the flags are set in the "re-calculation flag" fields in the statistical information 122 as shown in Table 5. That is, the statistics system 111 reads the statistical target information 123 whose event occurrence time (the "application target date") is contained in the current unit time period from the storage 12. Then, the statistics system 111 re-executes the statistical calculation for each of the unit time periods corresponding to the flagged entries. In this manner, re-executing the statistical calculation for each of the unit time periods, the statistics system 111 writes the newly obtained statistical result over the entry about the current unit time period in the statistical information 122, and resets the flag of the entry.

TABLE 5

Statistical information after executing re-calculation

| Starting time of statistical calculation | Total manpower | Average of traveling expense | Re-calculation flag |
|---|---|---|---|
| *2005/04/01 | 24 | 28,125 | |
| *2005/04/08 | 28 | 29,107 | |
| 2005/04/15 | 26 | 26,923 | |
| 2005/04/22 | 31 | 30,806 | |
| 2005/04/29 | 32 | 25,938 | |
| *2005/05/06 | 31 | 25,194 | |
| *2005/05/13 | 39 | 27,205 | |
| *2005/05/20 | 37 | 26,784 | |
| *2005/05/27 | 39 | 25,667 | |
| 2005/06/03 | 45 | 28,111 | |
| 2005/06/10 | 35 | 25,857 | |
| 2005/06/17 | 27 | 27,963 | |
| 2005/06/24 | 13 | 27,308 | |

(*Re-calculated entry)

<Operation>

As described above, when the statistics system program 121 of the embodiment is executed, the statistical target period after starting the statistical process is divided into a plurality of unit time periods. Many pieces of the statistical target information are entered into the statistical calculations for one or more unit time periods to which the occurrence times of the events indicated by the information belong. When statistical target information 123 about an event that occurs during the current unit time period is inputted after each unit time period expired, the statistical calculation is re-executed only for each of the unit time periods that contains the event occurrence times indicated by the inputted statistical target information 123. Therefore, the processing load of the CPU 10 can be sharply reduced as compared with the case where statistical calculations are re-executed for all the statistical information. Further, when statistical target information 123 about an event that occurs during the current unit time period is inputted after each unit time period expired, the CPU 10 does not re-execute the statistical calculation immediately, and the unit time period that should be re-calculated is flagged. Then, since the CPU 10 re-executes the statistical calculations for the flagged unit time periods at the same time, the processing load of the CPU 10 can be further reduced.

What is claimed is:

1. A period division statistics device that is connected to storage and an input device to take statistics based on a value of an event occurred at a certain time point and statistical target information indicating the occurrence time thereof, said period division statistics device comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device, reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

selecting the unit time period that contains the occurrence time of the event indicated by the inputted statistical target information among the unit time periods whose statistical results are registered in said storage, when the statistical target information is inputted through said input device;

reading all pieces of the statistical target information whose occurrence times are contained in the selected unit time period from said storage for each of the selected unit time periods; re-executing the statistical calculation for the values of events indicated by the read statistical target information; and overwriting the statistical result onto said storage.

2. A period division statistics device that is connected to storage and an input device to take statistics based on a value of an event occurred at a certain time point and statistical target information indicating the occurrence time thereof, said period division statistics device comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device;

reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

setting a flag to the unit time period that contains the occurrence time of the event indicated by the inputted statistical target information among the unit time periods whose statistical results are registered in said storage, when the statistical target information is inputted through said input device;

reading, at regular time intervals, all pieces of the statistical target information whose occurrence times are contained in the unit time period from said storage for each of the flagged unit time periods among the unit time periods whose statistical results are registered in said storage;

re-executing the statistical calculation for the values of events indicated by the read statistical target information; and overwriting the statistical result onto said storage.

3. The period division statistics device according to claim 1 or 2, wherein adjacent unit time periods are partially overlapped because said length of unit time period is longer than said interval of starting point that are defined in said statistical calculation rule.

4. The period division statistics device according to claim 1 or 2, wherein the statistical result about said each unit time period is stored in said storage with the information indicating the starting time of the unit time period and said flag.

5. A period division statistics method that is actualized by a computer connected to storage and an input device to take statistics based on a value of an event occurred at a certain time point and statistical target information indicating the occurrence time thereof, said method comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device, reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

selecting the unit time period that contains the occurrence time of the event indicated by the inputted statistical target information among the unit time periods whose statistical results are registered in said storage, when the statistical target information is inputted through said input device;

reading all pieces of the statistical target information whose occurrence times are contained in the selected unit time period from said storage for each of the selected unit time periods; re-executing the statistical calculation for the values of events indicated by the read statistical target information; and overwriting the statistical result onto said storage.

6. A period division statistics method that is actualized by a computer connected to storage and an input device to take statistics based on a value of an event occurred at a certain time point and statistical target information indicating the occurrence time thereof, said method comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device;

reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

setting a flag to the unit time period that contains the occurrence time of the event indicated by the inputted statistical target information among the unit time periods whose statistical results are registered in said storage, when the statistical target information is inputted through said input device;

reading, at regular time intervals, all pieces of the statistical target information whose occurrence times are contained in the unit time period from said storage for each of the flagged unit time periods among the unit time periods whose statistical results are registered in said storage;

re-executing the statistical calculation for the values of events indicated by the read statistical target information; and overwriting the statistical result onto said storage.

7. The period division statistics method according to claim 5 or 6, wherein adjacent unit time periods are partially overlapped because said length of unit time period is longer than said interval of starting point that are defined in said statistical calculation rule.

8. The period division statistics method according to claim 5 or 6, wherein the statistical result about said each unit time period is stored in said storage with the information indicating the starting time of the unit time period and said flag.

9. A program product comprising a period division statistics program recorded on a computer readable medium, said program being used to take statistics based on a value of an event occurred at a certain time point and statistical target information indicating the occurrence time thereof, said program making a computer connected to storage and an input device function as means comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device, reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

selecting the unit time period that contains the occurrence time of the event indicated by the inputted statistical target information among the unit time periods whose statistical results are registered in said storage, when the statistical target information is inputted through said input device;

reading all pieces of the statistical target information whose occurrence times are contained in the selected unit time period from said storage for each of the selected unit time periods; re-executing the statistical calculation for the values of events indicated by the read statistical target information; and overwriting the statistical result onto said storage.

10. A program product comprising a period division statistics program recorded on a computer readable medium, said program being used to take statistics based on a value of an event occurred at a certain time point and statistical target information indicating the occurrence time thereof, said program making a computer connected to storage and an input device function as means comprising:

referring a statistical calculation rule that defines a starting point of a statistical target period, an interval of a starting point of each unit time period and a time length of each unit time period in order to divide the statistical target period into a plurality of unit time periods;

storing statistical target information into storage, when the information is inputted through said input device;

reading, when any of the unit time periods expires, all pieces of the statistical target information whose occurrence times are contained in the expired unit time period from said storage, said unit time period being specified by the interval of starting point and the time length that are defined in said statistical calculation rule;

executing predetermined statistical calculations for the values of events indicated by the read statistical target information;

storing a statistical result obtained by the statistical calculations into said storage;

setting a flag to the unit time period that contains the occurrence time of the event indicated by the inputted statistical target information among the unit time periods whose statistical results are registered in said storage, when the statistical target information is inputted through said input device;

reading, at regular time intervals, all pieces of the statistical target information whose occurrence times are contained in the unit time period from said storage for each of the flagged unit time periods among the unit time periods whose statistical results are registered in said storage;

re-executing the statistical calculation for the values of events indicated by the read statistical target information; and overwriting the statistical result onto said storage.

11. The program product according to claim 9 or 10, wherein adjacent unit time periods are partially overlapped because said length of unit time period is longer than said interval of starting point that are defined in said statistical calculation rule.

12. The program product according to claim 9 or 10, wherein the statistical result about said each unit time period is stored in said storage with the information indicating the starting time of the unit time period and said flag.

* * * * *